United States Patent
Brown (10) Patent No.: US 6,701,399 B1
(45) Date of Patent: Mar. 2, 2004

(54) PRIORITY MECHANISM FOR SCHEDULING ISOCHRONOUS AND ASYNCHRONOUS TRANSACTIONS ON A SHARED BUS

(75) Inventor: Howard M. Brown, Pleasantville, NY (US)

(73) Assignee: Compaq Information Technologies Group, Houston, TX (US)

( * ) Notice: Subject to any disclaimer, the term of this patent is extended or adjusted under 35 U.S.C. 154(b) by 0 days.

(21) Appl. No.: 09/514,980

(22) Filed: Feb. 29, 2000

(51) Int. Cl.⁷ .......................... G06F 13/36; G06F 13/00
(52) U.S. Cl. ........................ 710/114; 710/107
(58) Field of Search .................. 709/231; 710/104, 710/107, 114, 244; 711/151, 158; 713/503

(56) References Cited

U.S. PATENT DOCUMENTS

| | | | | |
|---|---|---|---|---|
| 5,202,999 A | * | 4/1993 | Lenthall et al. | 710/244 |
| 5,544,324 A | * | 8/1996 | Edem et al. | 709/231 |
| 5,778,218 A | * | 7/1998 | Gulick | 713/503 |
| 5,862,360 A | * | 1/1999 | Meaney et al. | 711/151 |
| 6,032,211 A | * | 2/2000 | Hewitt | 710/107 |
| 6,397,277 B1 | * | 5/2002 | Kato et al. | 710/104 |
| 6,415,367 B1 | * | 7/2002 | Baxter et al. | 711/158 |

OTHER PUBLICATIONS

*Standards Project P1394 IEEE Draft Standard for a High Performance Serial Bus*, IEEE Standards Committee, 2 cover pages, pp. i–ii, 207–242, (Jul. 7, 1995).

*Universal Serial Bus Specification*, Compaq, Digital Equipment Corporation, IBM PC Company, Intel, Microsoft, NEC, Northern Telecom; Revision 1.0, Jan. 15, 1996, pp. 1 and 2, and pp. 54 through 83.

* cited by examiner

Primary Examiner—Tim Vo (57) ABSTRACT

A plurality of asynchronous and isochronous transactions on a shared bus are scheduled such that asynchronous latency is minimized while providing a maximum latency for isochronous transactions. This is accomplished by splitting an allocated shared bus time into frames of equal length. When a bus request is received the technique determines whether the bus request in a current frame is for an asynchronous transaction or an isochronous transaction. If an asynchronous transaction bus request exists it is processed, otherwise an isochronous transaction bus request is processed. Bus requests for an isochronous transaction are queued if received while an asynchronous transaction is currently being processed. Asynchronous transactions are given priority until a current frame time has ended. In one embodiment, at the start of a new frame (which becomes the current frame) any queued isochronous transactions are processed before asynchronous transactions of the current frame are given priority. In another embodiment, queued isochronous transactions are only processed at the start of a new frame if they are from two frames prior to the new frame.

24 Claims, 6 Drawing Sheets

PRIORITY MECHANISM FOR SCHEDULING ISOCHRONOUS AND ASYNCHRONOUS TRANSACTIONS ON A SHARED BUS

BACKGROUND OF THE INVENTION

1. Field of the Invention

The invention relates to scheduling of asynchronous and isochronous transactions on a shared bus, and more particularly to giving priority to asynchronous transactions to the extent that isochronous transaction latency does not exceed a desired time.

2. Description of the Related Art

Many computer systems utilize a shared bus that carries multiple types of traffic. For example, some shared buses carry both asynchronous and isochronous traffic. A Peripheral Component Interconnect (PCI) bus is an example of a shared bus that has been used to carry both asynchronous and isochronous traffic. While asynchronous traffic can be delayed indefinitely without adversely affecting real-time data streams, computer system performance can be adversely affected when the asynchronous traffic is delayed. Further, since isochronous traffic is time dependent, it requires a certain bandwidth and worst case latency. A multimedia stream (video and audio signal) is an example of isochronous traffic. Multimedia streams utilize an isochronous transport mechanism to ensure that data is delivered at least as fast as it needs to be displayed. Further, isochronous transport mechanisms have been utilized to ensure an audio signal is synchronized with a video signal. Provided bandwidth and latency requirements for isochronous traffic are met, latency of the isochronous traffic has not had an adverse effect on real-time performance.

A number of techniques have been employed to ensure that isochronous traffic had access to a shared bus for a given amount of time within a given frame. These methods have included static allocation of bandwidth and timer/counter based mechanisms which attempted to detect when isochronous transactions were complete. These prior methods have normally guaranteed isochronous latency at the expense of asynchronous latency. That is to say, the isochronous bus requests were fulfilled without consideration of the asynchronous bus requests. As a general rule, this resulted in increased latency for the asynchronous requests. In addition, trying to predict isochronous transaction requirements based on time averages has normally complicated system design.

SUMMARY OF THE PRESENT INVENTION

A system according to the present invention implements a technique for scheduling asynchronous and isochronous transactions on a shared bus that reduces asynchronous latency while keeping isochronous latency below an acceptable level. This is accomplished by splitting an allocated shared bus time into frames of equal length. When a bus request is received the technique determines whether the bus request in a current frame is for an asynchronous transaction or an isochronous transaction. If an asynchronous bus request exists it is processed, otherwise an isochronous bus request is processed. Bus requests for an isochronous transaction are queued if received while an asynchronous transaction is currently being processed. Asynchronous transactions are given priority until a current frame time has ended.

In one embodiment, at the start of a new frame any queued isochronous transaction requests are processed before asynchronous transaction requests of the current frame are given priority. In another embodiment, queued isochronous transaction requests are only processed at the start of the new frame if they are from two frames prior to the new frame. An advantage of the present technique is that it can be implemented using a few latches and a few relatively simple logic gates. Another advantage of the present technique is that scheduling of isochronous transactions are based on isochronous source requests.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT COMPUTER SYSTEM

Figure 1:
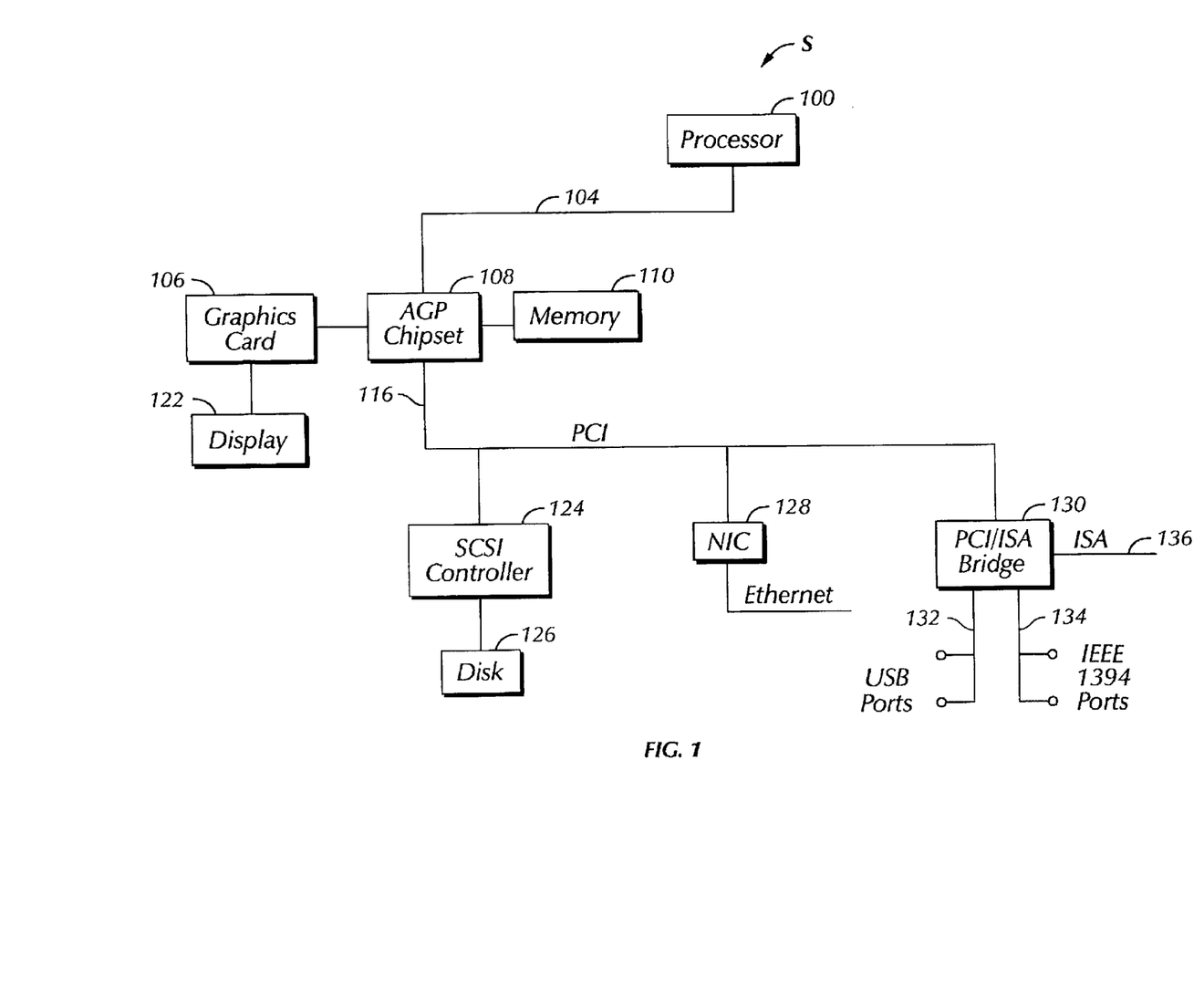
FIG. 1 is a block diagram illustrating a typical computer system S.

Turning to FIG. 1, illustrated is a block diagram of a computer system S according to an embodiment of the present invention. Processor 100 is coupled to a host bus 104. The processor 100 in the preferred embodiment is a Pentium II processor manufactured by the Intel Corporation. Alternatively, the present invention could be implemented in a multiprocessor workstation or any other computer system that utilizes a shared bus to carry asynchronous and isochronous traffic. Also coupled to the host bus 104 is a chipset 108. The chipset 108, as disclosed, is an accelerated graphics port (AGP) chipset which can be a 440BX AGPset manufactured by the Intel Corporation. The chipset 108 provides a memory controller for controlling memory 110, a host-PCI bus bridge for coupling a PCI bus 116 to the host bus 104, and an AGP connector for connecting a graphics card 106. A display 122, as shown, is coupled to the graphics card 106.

Coupled to the PCI bus 116 is a small computer system interface (SCSI) controller 124 and a network interface card (NIC) 128. The NIC 128 can provide an Ethernet connection for coupling the computer system S to a local area network (LAN). Coupled to the SCSI controller 124 is a disk subsystem 126. The SCSI controller 124 can potentially control various disk subsystems 126 which can include these types of peripheral devices: tape drives, WORM, CD-ROM, DVD, and optical storage devices.

Also coupled to the PCI bus 116 is a PCI/ISA bridge 130. As is common, the PCI/ISA bridge 130 converts data communicated from peripherals (not shown) coupled to an ISA bus 136 for utilization on the PCI bus 118. The PCI/ISA bridge 130 also provides USB ports 132 and IEEE 1394 ports 134. A variety of peripherals, that provide asynchronous and isochronous traffic, can be coupled to the USB ports 132 and the IEEE 1394 ports 134.

The Pentium II processor 100 can be replaced with different processors other than the Pentium II without detracting from the spirit of the invention. The processor 100 is capable of running any of a number of operating systems, such as Windows 98®, Windows NT®, or a Unix-based operating system.

Again, it should be understood that a wide variety of systems could be used instead of the disclosed computer system S without detracting from the spirit of the invention. Further, other current and future operating systems could also be utilized.

SCHEDULING ASYNCHRONOUS AND ISOCHRONOUS TRANSACTIONS

The disclosed technique provides for scheduling asynchronous and isochronous transactions on a shared bus and normally reduces asynchronous latency while maintaining isochronous latency below an acceptable level. While the technique addresses asynchronous and isochronous traffic, one of skill in the art will appreciate that, it can be applied to other types of traffic, when applicable. Asynchronous traffic is an example of a primary data transaction. Isochronous traffic is an example of a secondary data transaction. Asynchronous traffic involves primary data transactions in the sense that asynchronous traffic is generally given higher priority than isochronous traffic. In the same sense, isochronous traffic in comparison to asynchronous traffic can be considered as secondary data transactions. The scheduling techniques discussed herein in the context of asynchronous and isochronous transactions are equally applicable to other types of primary and secondary data transactions.

The shared bus can include a parallel bus such as a PCI bus or a serial bus such as an Ethernet connection carrying Ethernet data, a Universal Serial Bus (USB) or an IEEE 1394 bus. Initially, an allocated bus time is split (such as through time division multiplexing) into frames of equal length. The allocated bus time is based on factors which are typically application and system specific. When a bus request is received the technique determines whether the bus request in a current frame is for an asynchronous transaction or an isochronous transaction. As described below, the determination of the type of transaction can be accomplished in a number of ways.

If an asynchronous bus request has been initiated it is processed, otherwise an isochronous bus request (if any) is processed. Bus requests for an isochronous transaction are latched or queued if received while an asynchronous transaction is currently being processed. Asynchronous transactions are given priority until a current frame time has ended. In one embodiment, at the start of a new frame any queued isochronous transactions are processed before asynchronous transactions of a current frame are given priority. In another embodiment, queued isochronous transactions are only processed at the start of a new frame if they are from two frames prior to the new frame.

Figure 2:
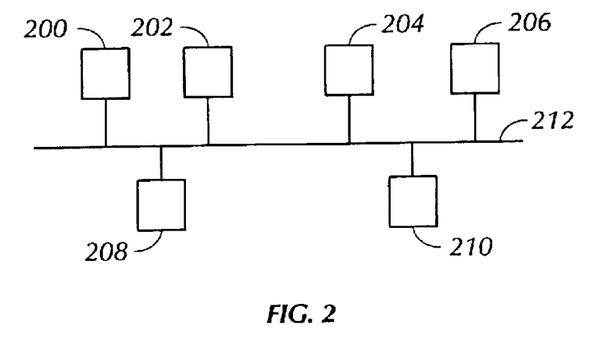
FIG. 2 is a block diagram illustrating multiple devices connected by a shared bus.

Moving to FIG. 2, a plurality of devices 200–210 coupled to a shared bus 212 are illustrated. The devices 200–210 could be a variety of types, such as a server or a workstation (represented by the computer system S) or any peripheral that is normally coupled to a particular type of shared bus that carries both asynchronous and isochronous traffic. The devices 200–210 transmit and receive isochronous and asynchronous data over the shared bus 212. As previously discussed, the shared bus can be either a parallel or serial bus. For example, the shared bus can be an Ethernet connection, a PCI bus, a USB or an IEEE 1394 bus.

When the shared bus is a PCI bus, two control signals (per the PCI specification) are used for arbitration (REQ* and GNT*). Each busmaster on the PCI bus is capable of asserting a bus request signal REQ* and responding to a bus grant signal GNT* (supplied by central arbitration logic). A typical PCI central arbitrator implementation is modeled on the central arbitration control point (CACP) as defined by microchannel architecture (MCA) or an EISA bus arbitrator. EISA uses an arbitration model with three priority levels: DMA/refresh (highest level); CPU/master (middle level); other masters (lowest level). The CACP is typically a dedicated chip which carries out bus arbitration and passes control to a busmaster. The priority of the busmasters coupled to the CACP is normally programmable.

A configuration area of 256 bytes (64 registers of 32 bits) is typically provided for each PCI device. A 64-byte header is typically included within the 256-byte configuration area. The 64-byte header normally includes a class code which indicates the type of PCI device. The class code includes a basic code and a subcode. The basic code relates the basic type of PCI device. For example, the basic code may indicate the following types of devices: a mass storage controller, a network controller, video controller, multimedia unit, a memory controller or a bridge. A subcode for a multimedia unit can indicate whether the multimedia unit is a video, audio, or other unit. Likewise, other PCI devices have corresponding subcodes. If a device is to act as a busmaster, then a busmaster (BM) bit of an instruction register (located within the configuration area) must be asserted. The configuration area can be accessed (read or write) with various functions of the BIOS interrupt 1ah.

In a PCI-based system where a CACP has been implemented, the CACP carries out bus arbitration and passes control to a busmaster. The arbitration process is initiated when multiple busmasters assert their bus request lines. Each busmaster has its own bus request output line. The CACP asserts an arbitration signal to indicate an arbitration cycle. Each busmaster that is requesting the PCI bus then outputs its priority code and compares it with other busmasters' priority code. Lower priority busmasters then deactivate their priority code. At this point, the CACP asserts a bus grant to the highest priority busmaster. Each busmaster has its own bus grant input line. The highest priority busmaster (current busmaster) then deasserts its bus request signal and takes control of the PCI bus. After the current busmaster is through using the PCI bus, or at the end of its allocated time, the current busmaster relinquishes the PCI bus. If multiple busmasters are then requesting the bus, then the arbitration process is repeated again.

Figure 3:
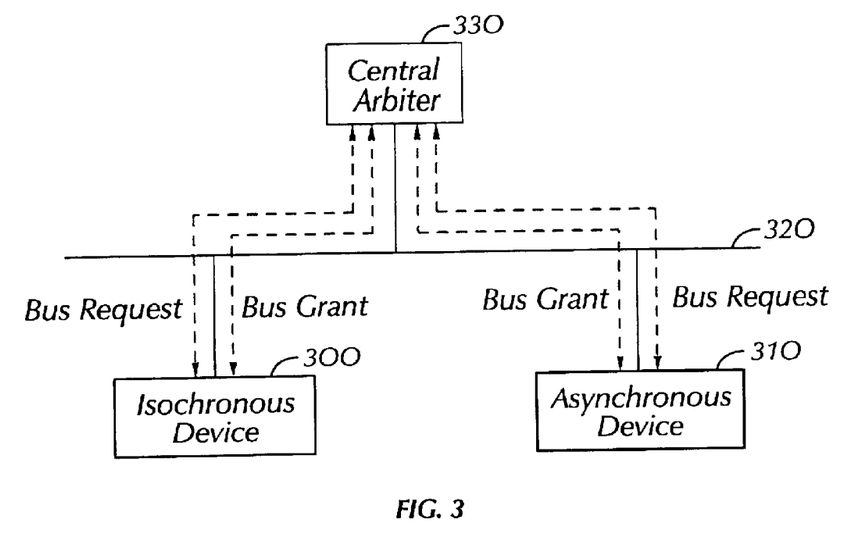
FIG. 3 is a block diagram depicting a central arbitrator communicating with an isochronous device and an asynchronous device.
Figure 4:
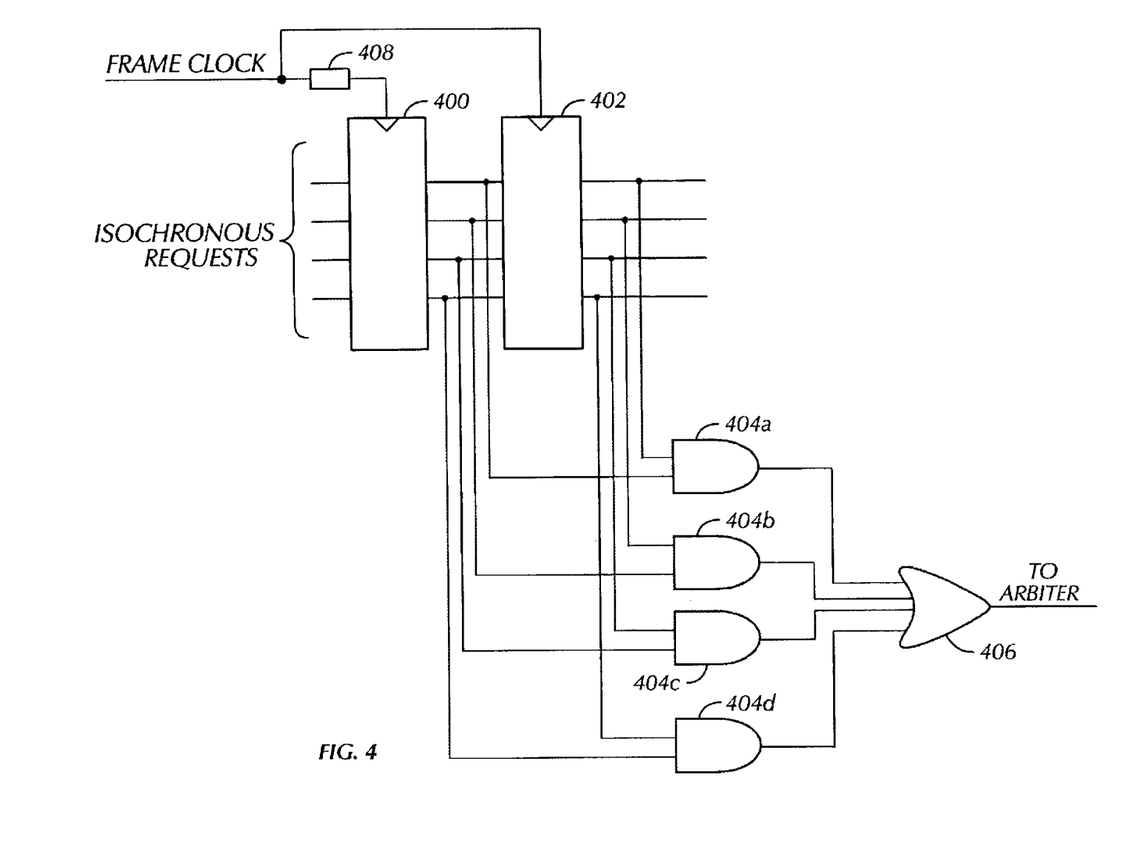
FIG. 4 is schematic diagram of hardware which implements an embodiment of the present invention.

Turning to FIG. 3, the arbitration process is further illustrated. When an asynchronous device 310 and an isochronous device 300 assert their bus request lines, the asynchronous device 310 is given priority, for a time, as discussed further below (in conjunction with FIGS. 5 and 6). The central arbitrator 330 determines which device becomes the next busmaster. The type of data (asynchronous or isochronous) provided by a device can be determined, for example, by reading a device's class code or by the priority of a device requesting the shared bus. Alternatively, a system designer may designate specific bus request inputs of an arbitrator as isochronous or asynchronous. Another approach may designate a specified amount of time at the start of each transmitted frame, in an ethernet system for example, where only left over isochronous requests would contend for the bus. FIG. 4 illustrates circuitry which when implemented in conjunction with a CACP type arbitrator allows isochronous traffic to gain use of the shared bus. While FIG. 3 shows an isochronous device 300 and an asynchronous device 310, it should be understood that isochronous data and asynchronous data may be provided to a shared bus by a same or different device.

Moving to FIG. 4, hardware which allows isochronous traffic to gain use of the shared bus is illustrated. The disclosed hardware can be implemented within a bus arbitrator of a shared bus. Isochronous requests are clocked into a latch 400 and 402 by a frame clock signal at time (t). While only four isochronous request lines are shown, the number of isochronous request lines can be scaled as dictated by the application. Initially, the latches 400 and 402 are reset by asserting a reset line (not shown). Output data of latch 400 is valid shortly after time (t), where (t) indicates a first frame clock. Output data of latch 402 is not valid until shortly after time (t+1), where (t+1) indicates a second frame clock. Shortly after the second frame clock signal (at time (t+1)), valid data exists at the outputs of latches 400 and 402.

To prevent a potential race condition when the latches 400 and 402 are clocked, a delay 408 can be introduced such that the clocking of the latch 400 is delayed from that of the latch 402. One skilled in the art will appreciate that a delay can be implemented in a variety of ways. Each of the data outputs of the latch 400 is ANDed (AND gates 404a, 404b, 404c, and 404d) with the corresponding data output of latch 402. Outputs of AND gates 404a, 404b, 404c, and 404d are coupled to an input of OR gate 406. An output of the OR gate 406 is coupled to the bus arbitrator such that when the output of OR gate 406 is asserted high the isochronous traffic is serviced at the beginning of a new frame. This occurs after a particular isochronous request is asserted high for two successive frames. Similarly, the above concept can be extended by adding additional latches and AND gates (with inputs corresponding to the number of latches). While the circuitry in FIG. 4 is intended for use with an arbitrator, it should be understood that logic for scheduling isochronous traffic according to the invention can be implemented in a variety of ways.

Figure 5:
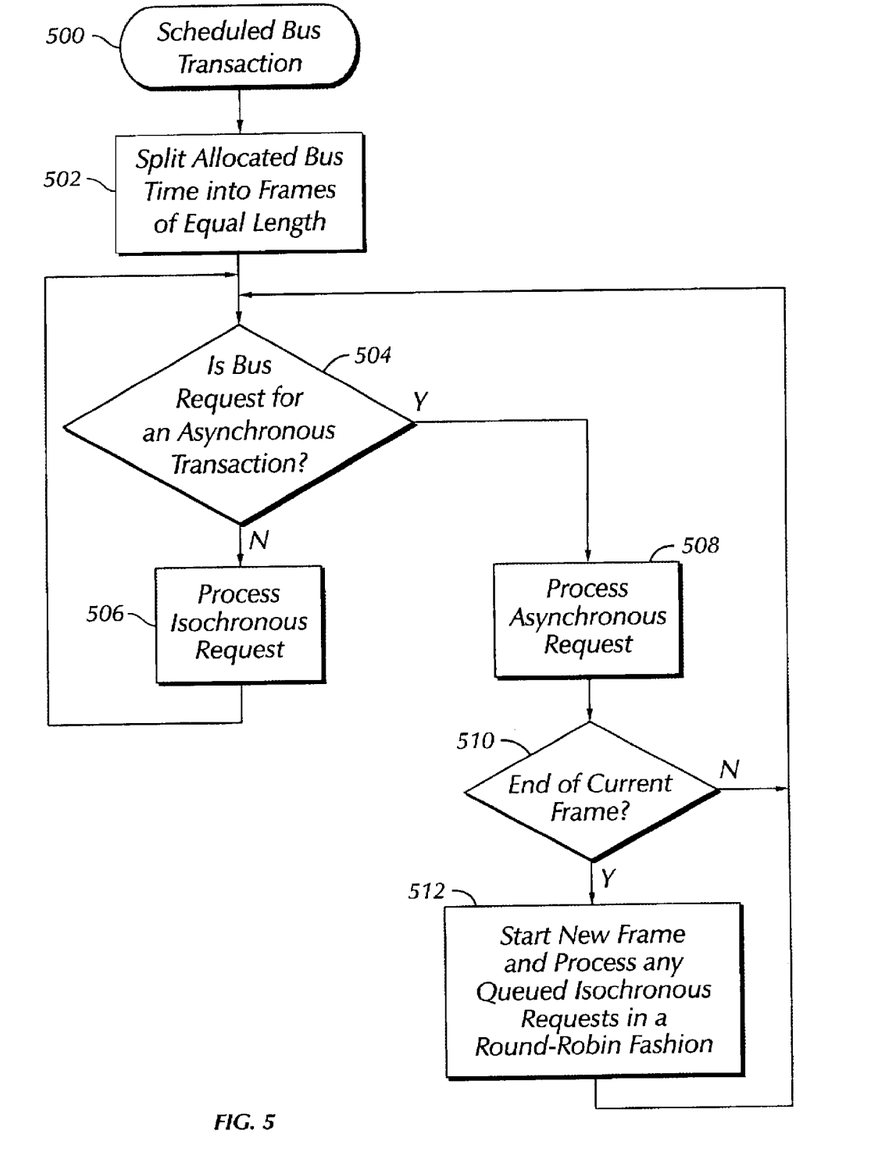
FIG. 5 is a flow chart illustrating one technique for scheduling bus transactions according to an embodiment of the present invention.

Turning to FIG. 5, a schedule bus transaction routine 500 is illustrated. In step 502, an allocated bus time is split into frames of equal length. From step 502, control transfers to step 504 where the routine 500 determines whether the bus request is for an asynchronous transaction. If the bus request is for an asynchronous transaction in step 504, control transfers to step 508. In step 508, the asynchronous transaction is processed. If an isochronous bus request occurs while the asynchronous transaction is being processed, then the isochronous transaction is queued. From step 508 control transfers to step 510. In step 510, the routine 500 determines whether a current frame has ended. The end of a current frame, for example, can be determined using timers. The beginning and ending of a frame are usually system and application specific. When the shared bus is an Ethernet, the beginning and ending of a frame are normally associated with a particular bit pattern in the data stream. If the current frame has ended, control transfers from step 510 to step 512. In step 512, a new frame is initiated and at the start of the new frame, any queued isochronous requests are processed in a round-robin fashion. From step 512, control returns to step 504.

In step 504, if the bus request is not for an asynchronous transaction, control transfers to step 506. In step 506, an isochronous request is processed. From step 506, control transfers to step 504. Thus, asynchronous requests are processed with the highest priority during a current frame. At the start of a new frame, any queued isochronous requests are then processed in a round-robin fashion. Utilizing this approach an isochronous request is delayed for, at most, two frames. That is, an isochronous request at the beginning of a current frame is serviced by the end of a new frame.

Figure 6:
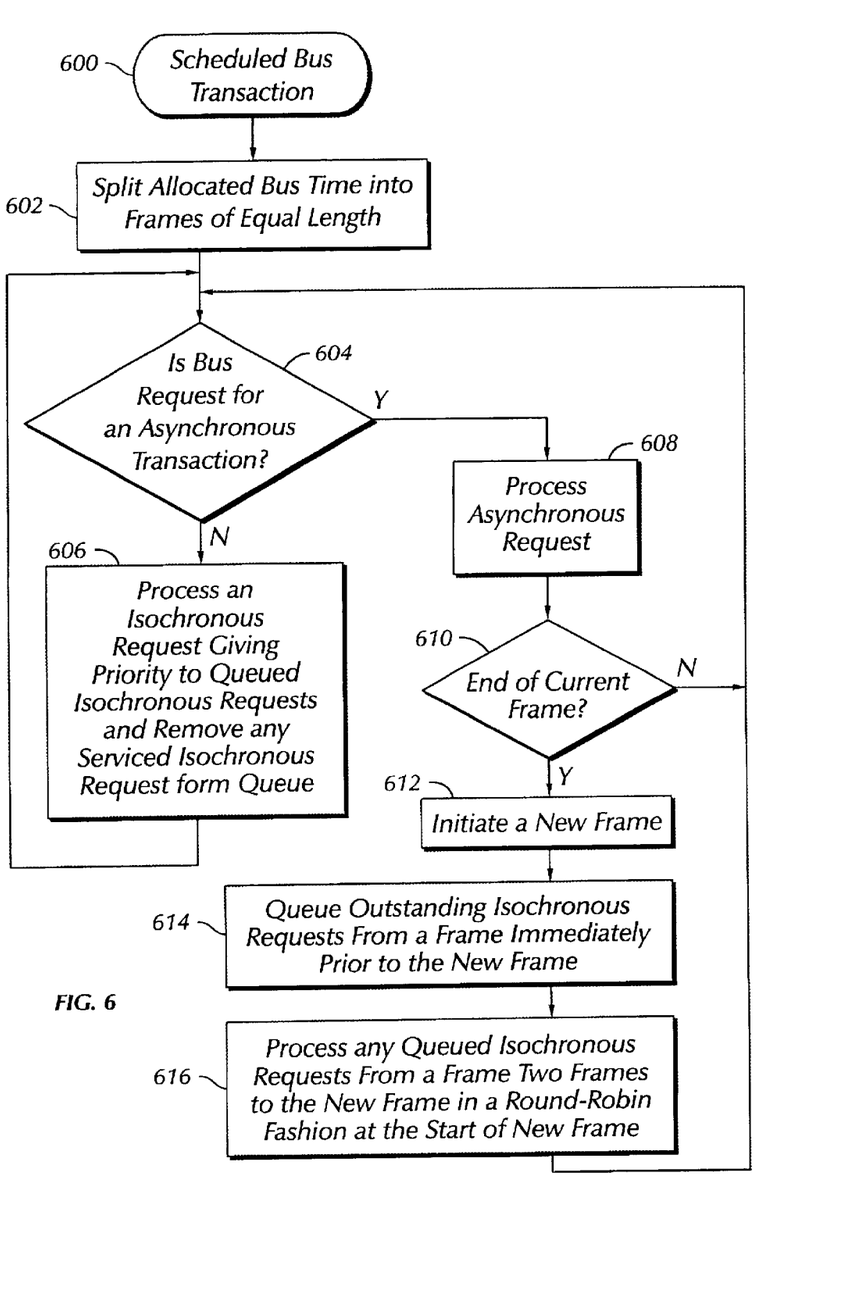
FIG. 6 is a flow chart illustrating another technique for scheduling bus transactions according to a different embodiment of the present invention.

Moving to FIG. 6, a schedule bus transaction routine 600 is illustrated. In step 602, the bus time is split into frames of equal length. As previously stated, a particular allocated bus time is application specific. For example, asynchronous traffic across a PCI bus may be limited such that various other peripherals attached to the PCI bus can utilize the PCI bus. From step 602, control transfers to step 604. In step 604, the routine 600 determines whether a bus request is for an asynchronous transaction. If the bus request is for an asynchronous transaction, then control transfers from step 604 to step 608. In step 608, the asynchronous transaction is processed. From step 608, control transfers to step 610. In step 610, the routine 600 determines whether a current frame has ended. As above, the end of an Ethernet frame is usually detected by a particular bit pattern in the transmitted information. If the current frame has not ended, then control transfers from step 610 to step 604. If the current frame has ended, then control transfers from step 610 to step 612.

In step 612 a new frame is initiated. From step 612, control transfers to step 614 where the routine 600 stores any outstanding isochronous requests from a frame immediately prior to the new frame. One skilled in the art will appreciate these requests might be stored in a variety of ways (e.g., FIFO buffer or table). From step 614, control transfers to step 616. In step 616, the routine 600 processes any isochronous requests from two frames prior to the new frame in a round-robin fashion at the start of the new frame. From step 616, control transfers to step 604. From step 604, if a bus request is not for an asynchronous transaction, then control transfers to 606. In step 606, the routine 600 processes isochronous requests and removes any serviced isochronous transaction from the list created in step 614. From step 606, control returns to step 604.

Thus, with this technique, an isochronous transaction is delayed, at most, three frames before being processed. That is, an isochronous request at the beginning of one frame is serviced by the end of a second successive frame. As in FIG. 5, asynchronous transactions in a current frame are processed with priority over an isochronous transaction of the current frame. Further, asynchronous transactions in a current frame are processed with priority over an isochronous transaction of a frame immediately preceding the current frame. One skilled in the art will appreciate the sort of logic or code helpful to implement the techniques described in connection with FIGS. 5 and 6.

Figure 7:
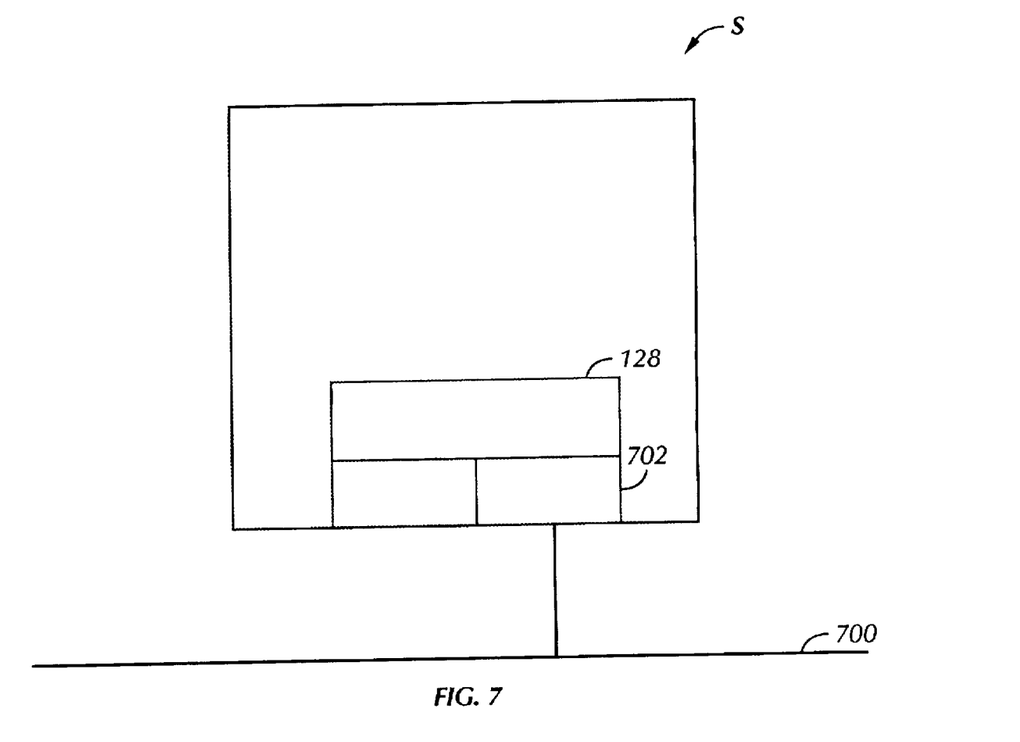
FIG. 7 is a block diagram illustrating a network interface card which includes network driver firmware (including code to schedule asynchronous and isochronous transactions) according to an embodiment of the present invention.

Turning to FIG. 7, an embodiment of the present invention which is implemented within a network interface card (NIC) 128 is illustrated. When the shared bus is an Ethernet, the type of frame can be determined through examining an address field (sending or receiving) or control field of the frame. The NIC 128 is included within the computer system S and enables the system S to transmit and receive data across a shared bus 700. A typical network driver routine implements code to allow a device to drive information onto the shared bus 700. The driver routine may reside in firmware 702 on the network interface card 128 or be stored elsewhere within the computer system S. The device could be of a variety of types, such as a server or a workstation (represented by the computer system S). The network driver routine causes the information that is to be transferred to be driven onto the shared bus 700. FIG. 7 illustrates the NIC 128 as containing the network driver routine (firmware) 702 which schedules asynchronous and isochronous transactions of a particular device on the shared bus 700 according to the present invention. It should be understood that the disclosed scheduling techniques can be implemented in hardware or software.

Thus, asynchronous and isochronous transactions on a shared bus are scheduled such that asynchronous latency is generally reduced while maintaining isochronous latency below an acceptable level. When a bus request is received the technique determines whether the bus request in a current frame is for an asynchronous transaction or an isochronous transaction. If an asynchronous bus request has been initiated it is processed, otherwise an isochronous bus request is processed. Bus requests for an isochronous transaction are queued if received while an asynchronous transaction is currently being processed. Asynchronous transactions are given priority until a current frame time has ended. In one disclosed embodiment, at the start of a new frame any queued isochronous transactions are processed before asynchronous transactions of the current frame are given priority. In another disclosed embodiment, queued isochronous transactions are only processed at the start of the new frame if they are from two frames prior to the new frame. Either approach normally optimizes bandwidth between asynchronous and isochronous traffic.

The foregoing disclosure and description of the various embodiments are illustrative and explanatory thereof, and various changes in the components, circuit elements, bus characteristics, data characteristics, code, wiring connections and contacts, as well as in the details of the illustrated hardware and software and construction and method of operation may be made without departing from the spirit of the invention.

What is claimed is:

1. A method for scheduling a plurality of primary and secondary transactions between a first device and a second device across a shared bus, comprising the steps of:
    (a) splitting an allocated bus time for the shared bus into frames of equal length;
    (b) receiving a bus request and determining whether the bus request in a current frame is for a primary transaction or a secondary transaction;
    (c) processing a primary transaction bus request if one exists, otherwise processing a secondary transaction bus request if one exists, wherein secondary transaction bus requests are queued if received while one of the primary transaction bus requests is currently being processed;
    (d) repeating steps (b) through (c) until a current frame time has ended; and
    (e) processing queued secondary transaction bus requests at the start of a new frame before continuing with step (b), wherein the new frame becomes the current frame of step (b),
    wherein the queued secondary transaction bus requests of step (e) are only processed at the start of the new frame if they are from two frames prior to the new frame.

2. The method of claim 1, wherein the primary transaction is an asynchronous transaction and the secondary transaction is an isochronous transaction.

3. The method of claim 1, wherein the secondary transaction bus requests of step (c) are processed in the order in which they were received, and wherein secondary transaction bus requests from an immediately prior fire are processed before secondary transaction bus requests of the current frame.

4. The method of claim 1, wherein the queued secondary transaction bus requests of step (e) are processed in a round-robin fashion at the start of the new frame.

5. The method of claim 1, wherein the shared bus is an Ethernet connection.

6. The method of claim 1, wherein the shared bus is a Universal Serial Bus.

7. The method of claim 1, wherein the shared bus is an IEEE 1394 bus.

8. The method of claim 1, wherein the shared bus is a PCI bus.

9. The method of claim 1, wherein the first and second devices are workstations.

10. The method of claim 1, wherein the first and second devices are peripherals.

11. The method of claim 1, wherein the first and second devices are Windows-based servers.

12. The method of claim 1, wherein the first device is a workstation and the second device is a Windows-based server.

13. A computer system having the capability of scheduling transactions across a shared bus, comprising:
    a processor;
    a mass storage device coupled to the processor;
    transaction scheduling code stored in a processor readable medium for causing the processor to perform the steps of:
    (a) splitting an allocated bus time for the shared bus into frames of equal length;
    (b) receiving a bus request and determining whether the bus request in a current frame is for a primary transaction or a secondary transaction;
    (c) processing a primary transaction bus request if one exists, otherwise processing a secondary transaction bus request if one exists, wherein secondary transaction bus requests are queued if received while one of the primary transaction bus requests is currently being processed;
    (d) rag steps (b) through (c) until a current frame time has ended; and
    (e) processing queued secondary traction bus requests at the start of a new frame before continuing with step (b), wherein the new frame becomes the current frame of step (b),
    wherein the queued secondary transactions bus requests of step (e) are only processed at the start of the new frame if they are from two frames prior to the current frame.

14. The computer system claim 13, wherein the primary transaction is an asynchronous transaction and the secondary transaction if an isochronous transaction.

15. The computer system of claim 13, wherein secondary transaction bus requests of step (c) are processed in the order in which they were received, and wherein secondary transaction bus requests from an immediately prior frame are processed before secondary transaction bus requests of the current frame.

16. The computer system of claim 13, wherein the queued secondary transaction bus requests of step (e) are processed in a round-robin fashion at the start of the new frame.

17. The computer system of claim 13, wherein the shared bus is an Ethernet connection.

18. The computer system of claim 13, wherein the shared bus is a Universal Serial Bus.

19. The computer system of claim 13, wherein the shared bus is an IEEE 1394 bus.

20. The computer system of claim 13, wherein the shared bus is a PCI bus.

21. The computer system of claim 13, wherein the processor is coupled to a workstation by the shared bus.

22. The computer system of claim 13, wherein the processor is coupled to a peripheral by the shared bus.

23. The computer system of claim 13, wherein the processor is coupled to a Windows-based server by the shared bus.

24. The computer system of claim 13, wherein the computer system is a workstation that is coupled to a Windows-based server by the shared bus.

\* \* \* \* \*